(12) United States Patent
Dowlatkhah et al.

(10) Patent No.: US 11,153,801 B2
(45) Date of Patent: Oct. 19, 2021

(54) FACILITATING DYNAMIC MULTIPLE PUBLIC LAND MOBILE NETWORK RESOURCE MANAGEMENT IN ADVANCED NETWORKS

(71) Applicants: AT&T Intellectual Property I, L.P., Atlanta, GA (US); AT&T Mobility II LLC, Atlanta, GA (US)

(72) Inventors: Sangar Dowlatkhah, Plano, TX (US); Zhi Cui, Sugar Hill, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 11 days.

(21) Appl. No.: 16/396,302

(22) Filed: Apr. 26, 2019

(65) Prior Publication Data

US 2020/0344663 A1    Oct. 29, 2020

(51) Int. Cl.
*H04W 40/04*    (2009.01)
*H04L 12/24*    (2006.01)
*H04L 12/741*   (2013.01)
*H04L 12/729*   (2013.01)

(52) U.S. Cl.
CPC ......... *H04W 40/04* (2013.01); *H04L 41/5019* (2013.01); *H04L 41/5041* (2013.01); *H04L 45/125* (2013.01); *H04L 45/74* (2013.01)

(58) Field of Classification Search
CPC .. H04W 40/04; H04L 45/125; H04L 41/5041; H04L 41/5019; H04L 45/74
See application file for complete search history.

(56) References Cited

U.S. PATENT DOCUMENTS

| | | | |
|---|---|---|---|
| 8,620,383 B2 | 12/2013 | Panchal et al. | |
| 9,462,477 B2 | 10/2016 | Ahmad et al. | |
| 9,717,031 B2 | 7/2017 | Centonza et al. | |
| 9,826,411 B2 | 11/2017 | Perez et al. | |
| 10,136,309 B2 | 11/2018 | Knisely et al. | |
| 10,667,179 B1 * | 5/2020 | Young | H04W 28/18 |
| 2014/0029529 A1 | 1/2014 | Gogic et al. | |

(Continued)

OTHER PUBLICATIONS

X. Artiga, J. Nunez-Martinez, A. Perez-Neira, G. J. L. Vela, J. M. F. Garcia and G. Ziaragkas, "Terrestrial-satellite integration in dynamic 5G backhaul networks," 2016 8th Advanced Satellite Multimedia Systems Conference and the 14th Signal Processing for Space Communications Workshop. (Year: 2016).*

*Primary Examiner* — Jae Y Lee
*Assistant Examiner* — Mohammed M Murshid
(74) *Attorney, Agent, or Firm* — Amin, Turocy & Watson, LLP

(57) ABSTRACT

Facilitating dynamic satellite and mobility convergence for mobility backhaul in advanced networks (e.g., 4G, 5G, 6G and beyond) is provided herein. Operations of a system can comprise dividing resources of a wireless network between a first network device and a second network device based on defined service level agreements. The operations also can comprise receiving a data packet from a mobile device. The data packet can comprise an indication that the first network device provides services for the mobile device. Further, the operations can comprise transferring the data packet to the first network device based on the resources assigned to the first network device and based on the data packet bypassing an access core of the wireless network.

20 Claims, 10 Drawing Sheets

(56) References Cited

U.S. PATENT DOCUMENTS

| | | |
|---|---|---|
| 2014/0357218 A1 | 12/2014 | Andrianov et al. |
| 2016/0044702 A1 | 2/2016 | Centonza et al. |
| 2016/0269286 A1* | 9/2016 | Zhou ...................... H04L 45/38 |
| 2017/0318445 A1* | 11/2017 | Kodaypak ............... H04W 4/70 |
| 2018/0048584 A1* | 2/2018 | Ra ......................... H04L 47/781 |
| 2018/0184331 A1* | 6/2018 | Samdanis ............. H04W 28/16 |
| 2018/0234885 A1 | 8/2018 | Rink et al. |
| 2018/0242304 A1* | 8/2018 | Rong ................... H04W 72/048 |
| 2019/0045421 A1* | 2/2019 | Shah ..................... H04W 40/02 |
| 2020/0204977 A1* | 6/2020 | Panchal .................. H04L 47/56 |

* cited by examiner

FACILITATING DYNAMIC MULTIPLE PUBLIC LAND MOBILE NETWORK RESOURCE MANAGEMENT IN ADVANCED NETWORKS

TECHNICAL FIELD

This disclosure relates generally to the field of mobile communication and, more specifically, to facilitating dynamic multiple public land mobile network resource management in advanced networks (e.g., 5G, 6G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
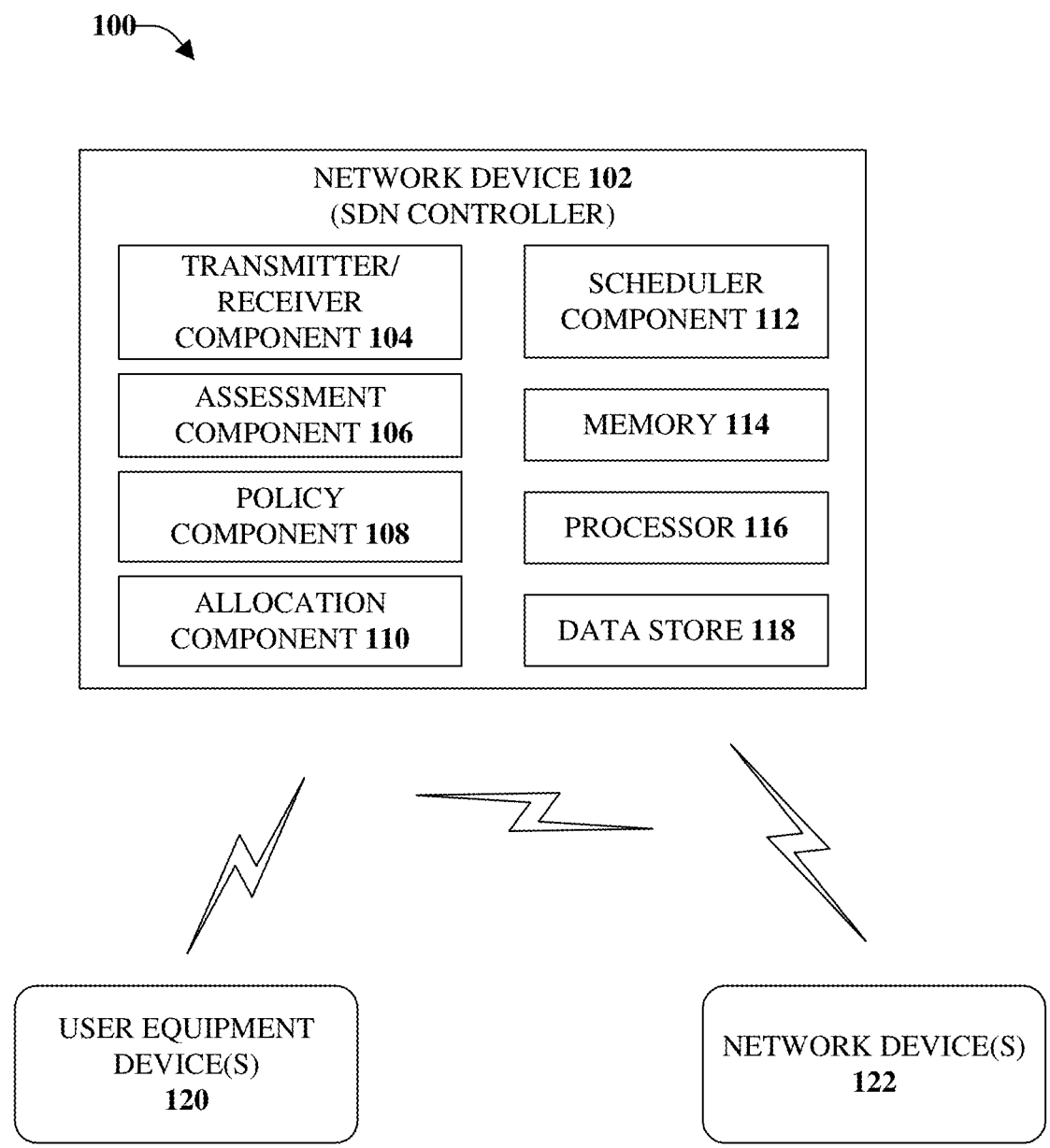
FIG. 1 illustrates an example, non-limiting, system for facilitating dynamic multiple public land mobile network resource management in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate dynamic multiple public land mobile network resource management in advanced networks. To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 6G network can utilize more openness and sharing on the common infrastructure. However, very limited sharing is possible, such as, sharing the entire resource without the ability to decide what percentage of resources is shared. For example, a carrier can share its radio network with its subbrand (e.g., a nationally-known mobile network provider and a smaller affiliate). In this case, the entire radio resource can be shared between the host and subcarrier without the ability to control how much resources are to be shared between the subcarriers. In addition, the hosting carrier has the responsibility of providing the service over the entire mobility network including the Radio Access Network (RAN) and core, while meeting regulatory requirements.

As discussed herein, a "tenant" can be an entity, such as a wireless service provider, that utilizes resources provided by a network operator (e.g., a host carrier platform or simply host). An entity can be one or more computers, the Internet, one or more systems, one or more commercial enterprises, one or more computers, one or more computer programs, one or more machines, machinery, one or more actors, one or more users, one or more customers (e.g., of a wireless service provider), one or more humans, and so forth, hereinafter referred to as an entity or entities depending on the context.

Although the tenant utilizes the resources of the host or network operator, the end user is not aware (or does not care) that the host is providing those resources. For example, a logo or other information associated with the tenant can be perceivable via the user equipment device (not the logo of the host). This is achieved by sending the entire radio access to the core. The core handles the radio access and sends the information to the correct subscriber (e.g., end user) with the correct PLMN address. Thus, the entire access data goes to the core initially. This is not efficient with advanced networks that have a large bandwidth ability. Accordingly, the various aspects discussed herein can be utilized to divide access resources between the tenants.

How to provide mechanism to allow dynamic sharing of much broader pooled RAN resources and divide them among different tenants according to service level agreement and host carrier policy is at least one challenge that can be solved with the disclosed aspects. For example, the various aspects discussed herein can facilitate dynamic sharing of pooled RAN resources and divide the resources among different tenants according to service level agreement and/or host carrier policy. Further, the tenant may only share the RAN with the host carrier and by using their own core and service delivery platform.

The host carrier can use a policy to provide guidelines on how to share among the tenant carriers, including a radio resource layer (e.g. types of radio, such as 3GPP radio only for secure applications, and any radio for regular service delivery including satellite radio for a global resource management, and so on), service level agreement, and management requirements (e.g. monitoring, global load balancing, and so forth) if needed. Further, the hosting carrier can also provide services based on security requirements with different micro service requirements in a 6G network.

According to an embodiment, provided is a method that can comprise establishing, by a first network device comprising a processor, a division of resources of a wireless network between a second network device and a third network device. The division of resources can comprise a first group of resources assigned to the second network device and a second group of resources assigned to the third network device. The method also can comprise analyzing, by the first network device, a data packet received from a user equipment device. The data packet can comprise information indicative of the second network device. Further, the method can comprise routing, by the first network device, the data packet from the user equipment device to the second network device based on a policy associated with the division of resources.

In an example, the resources can comprise pooled radio access network resources. Further, in some implementations, the wireless network can be adapted to operate according to a sixth generation wireless telecommunication protocol.

The method can comprise, according to some implementations, bypassing an access core of the first network device during the routing of the data packet. Bypassing the access core of the first network device can be based on routing the data packet to avoid being routed through the access core of the first network device. Further to these implementations, the first network device can be associated with a wireless network platform that hosts communications within the wireless network (e.g., a host). The second network device can be associated with a first service provider core network (a first tenant). In addition, the third network device can be associated with a second service provider core network (e.g., a second tenant). In an example, routing the data packet can comprise forwarding the data packet to an access core and a service delivery platform of the second network device.

According to some implementations, establishing the division of resources can comprise assigning a first access slice to the second network device and assigning a second access slice to the third network device. A first capacity can be associated with the first access slice and a second capacity can be associated with the second access slice. In an example, the first capacity and the second capacity can be different levels of capacities determined based on a network sharing policy.

In another example, the first capacity and the second capacity can be scalable capacities. Further to this example, the method can comprise fluctuating, by the first network device, a first level of the first capacity and a second level of the second capacity based on a defined parameter. According to another example, the method can alternatively, or additionally, comprise detecting, by the first network device, a trigger event associated with the user equipment device and increasing, by the first network device, the first capacity based on detecting the trigger event and a defined policy associated with the trigger event.

According to some implementations, establishing the division of resources can comprise comparing a first service level agreement for the second network device with a second service level agreement for the third network device. Further, establishing the division of resources can comprise distributing the resources between the second network device and the third network device based on the comparing.

Another embodiment can relate to a method that can comprise a system that can comprise a processor and a memory that stores executable instructions that, when executed by the processor, facilitate performance of operations. The operations can comprise dividing a group of pooled radio access network resources of a wireless network between a first network device and a second network device. Dividing the group of pooled radio access network resources can comprise assigning a first group of resources of the pooled radio access network resources to the first network device and a second group of resources of the pooled radio access network resources to the second network device. The operations also can comprise evaluating a usage of the pooled radio access network resources. Further, the operations can comprise adjusting a first quantity of resources in the first group of resources and a second quantity of resources in the second group of resources based on the usage, a defined policy, and a condition of the wireless network.

According to some implementations, adjusting the first quantity can comprise increasing the first quantity of resources based on a determination that the condition is an emergency situation and that the first network device is associated with user equipment devices of responders to the emergency situation.

Assigning the first group of resources can comprise, according to some implementations, a first amount of resources and the second group of resources can comprise a second amount of resources. The first amount of resources and the second amount of resources can be configurable amounts that can fluctuate based on the defined policy.

In accordance with some implementations, the operations can comprise receiving a data packet from a user equipment device. The data packet can comprise an indicator. The operations also can comprise determining the data packet is to be scheduled for the first network device based on the indicator. Further, the operations can comprise routing the data packet to the first network device, wherein the data packet bypasses an access core of the wireless network.

In an example, routing the data packet can comprise bypassing the access core of the wireless network based on routing the data packet to avoid being routed through the access core of the wireless network. In another example, routing the data packet can comprise forwarding the data packet to the access core and a service delivery platform of the first network device.

Another embodiment can relate to a machine-readable storage medium, comprising executable instructions that, when executed by a processor, facilitate performance of operations. The operations can comprise dividing resources of a wireless network between a first network device and a second network device based on defined service level agreements. The operations also can comprise receiving a data packet from a mobile device, wherein the data packet comprises an indication that the first network device provides services for the mobile device. Further, the operations can comprise transferring the data packet to the first network device based on the resources assigned to the first network device and based on the data packet bypassing an access core of the wireless network.

In accordance with some implementations, dividing the resources can comprise assigning a first access slice to the first network device and assigning a second access slice to the second network device. A first capacity can be associated with the first access slice and a second capacity can be associated with the second access slice.

Further to these implementations, the operations can comprise evaluating a condition of at least a portion of the wireless network for a defined trigger event. The operations also can comprise increasing a first level of the first capacity based on a detection of the defined trigger event. Further, the operations can comprise decreasing a second level of the second capacity based on the detection of the defined trigger event.

Referring initially to FIG. 1, illustrated is an example, non-limiting, system 100 for facilitating dynamic multiple public land mobile network resource management in advanced networks in accordance with one or more embodiments described herein. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The various aspects discussed herein, can allow dynamic sharing of pooled RAN resources. Further, the various aspects can divide the pooled RAN resources among different tenants (e.g., different network devices) according to various criteria (e.g., a service level agreement, a host carrier policy, and so on).

As illustrated in FIG. 1, the system 100 can include a network device 102 that can facilitate radio resource management for a wireless communications network in accordance with one or more embodiments described herein. According to some implementations, the wireless communications network can be a 6G ubiquitous wireless communications network. Further, according to some implementations, the network device 102 can be an SDN controller device.

The network device 102 can comprise a transmitter/receiver component 104, an assessment component 106, a policy component 108, an allocation component 110, a scheduler component 112, at least one memory 114, at least one processor 116, and at least one data store 118. The network device 102 can be configured to communicate (e.g., via the transmitter/receiver component 104) with one or more user equipment devices 120 and/or one or more other network devices 122. For example, the network device 102 can be associated with a wireless network platform that hosts communications within the wireless network. Further, a second network device (of the one or more other network devices 122) can be associated with a first service provider core network, a third network device (of the one or more other network devices 122) can be associated with a second service provider core network, and so forth.

As mentioned, tenants can be companies, enterprises, or the like, that can use the access information and direct the data. Thus, instead of going to the core of the host, the data can go directly to the core of the tenant. Accordingly, instead of sending the entire data stream from the access to the core, the information coming from the user equipment device into the access can be parsed among the different wireless service providers based on information associated with the data. For example, the data package that goes through the user equipment devices into the radio antennas, or eNodeBs, can be tagged. Based on the respective tags, when the data packet is traversing through the access control center, the access control center can send the data packets to the correct access network (e.g., tenant).

For example, when information is received from the subscribers (e.g., the end users), the information can include two different structures: a control plane and a user plane. The user plane can include the data the subscriber sends (e.g., text, email, and so on). The control plane is in the background and sets up the connection and indicates the destination. The control plane can be divided into two parts: common data and dedicated data. The common data is data that is for all the PLMNs or "carriers." The dedicated data is the dedicated information per carrier. Further details related to the user plane and the control plane will be discussed with respect to FIGS. 2 and 3 below.

The system 100, as well as other embodiments provided herein, can provide a mechanism to allow dynamic sharing of pooled RAN resources and divide pooled RAN resources among different tenants according to service level agreement and/or host carrier policy. According to some implementations, there can be pre-agreement among carriers. To distinguish the different carriers, an assessment component 106 can evaluate incoming data packets (e.g., from one or more user equipment devices). The data packets can be evaluated by the assessment component 106 for an indicator or tag that is indicative of a carrier (e.g., a network device) associated with the data packet.

For example, data packets belonging to different carriers (e.g., tenants) can have respective tags to indicate a carrier by which the service is provided. For example, when a data packet is sent from a user equipment device, the data packet can include the identifier, which can be an identifier that indicates a cell site, an area, a PLMN, and so on. It is noted that the PLMN can be different for different carriers. In an example, the indicator can be included in a header of the data packet. In another example, the indicator can be included in a pay load of the data packet.

The policy component 108 can establish or define one or more policies regarding dynamic partition and/or sharing of the resources. For example, a policy can be related to the types of radio, such as 3GPP radio only for secure applications, and any radio for regular service delivery. Additionally, or alternatively, the policy can indicate the percentage of the radio resources. For example, the percentage can change depending on time of day, network congestion condition, application, and so on.

An allocation component 110 can dynamically manage division of the network resources. For example, the allocation component 110 can divide a group of pooled radio access network resources of a wireless network between two or more network devices (excluding the network device 102). For example, the allocation component 110 can assign a first group of resources of the pooled radio access network resources to a second network device (e.g., a first tenant) and a second group of resources of the pooled radio access network resources to a third network device (e.g., a second tenant).

To divide or allocate the resources, the allocation component 110 can evaluate one or more policies (e.g., service level agreements between the network devices). Further, the allocation component 110 can communicate (e.g., via the transmitter/receiver component 104) with radio controller function within the RAN and/or within each RAN slice about the resource division decision. The allocation component 110 (e.g., via the transmitter/receiver component 104) can also communicate information related to how to treat the user packets based on service level agreement.

For example, there can be a large amount of data being received from the access in advanced networks (e.g., 6G, 5G, and so on). The large amount of data can be shared between a number of carriers. The allocation component 110 can dynamically divide these resources depending on how much data at any point in time that each carrier needs. This can be based on a service level agreement in accordance with some implementations. In an example, a first carrier can indicate its subscriber takes priority and can purchase the priority services (e.g., premium services). Thus, the allocation component 110 can assign additional resources for that carrier/subscriber combination.

According to another example, in the case of a trigger event, such as natural disaster, man-made disaster, or another emergency situation including a national security situation, the occurrence of the emergency can affect how many resources each carrier will receive. For example, if emergency personnel (e.g., first responders) are in the area, such responders need to communicate with one another and with dispatch services. Accordingly, during the emergency situation, and based on various rules and/or policies, the carrier (or carriers) used for the first responders can be given priority ad additional resources could be assigned to those carrier(s). For example, the one or more carriers supporting the first responders can receive a higher portion when needed according to the policy. Thus, the allocation component 110 can scale the resources up and/or down depending on the situation, for example.

According to some implementations, a scheduler component 112 (which can be a radio controller function within RAN and/or within each slide) can schedule the RAN resources to deliver the services to the end device. In an example, the scheduler component 112 can assign a first access slice to a second network device, a second access slice to a third network device, and subsequent access slices to subsequent network devices. The scheduling by the scheduler component 112 can be based on guidance from an SDN controller, for example. In accordance with some implementations, the tenant might only share their RAN with a hosting carrier and use their own core and service delivery platform.

For example, tenants do not want other tenants to have access to their information. This is not a concern with the disclosed aspects because the information (e.g., packets) do not go to a common core (e.g., the host core) to be analyzed. Accordingly, the disclosed aspects provide routing of packets that are totally separated logically from one other. Each tenant has its own core and its own impact point or access point common to the core. There is nothing common between tenants that would jeopardize the integrity of the package.

The network device 102 can configure the radio network regarding how to route the packets to different tenant core networks according to the tag (or other indicator) included in the data packet. Further, not only can the network device decide which core it goes to, it can decide the sub-core. For example, if a tenant decides it wants to use the host core as a secondary back up core (and have their own core) and there is a congestion, the network device 102 can decide it is going to use the additional core (e.g., the secondary core). Thus, the disclosed aspects can enhance the intelligence in diverting traffic.

Further, the transmitter/receiver component 104 can route the data packet from the user equipment device to another network device (e.g., a tenant device) based on a policy associated with the division of resources. The transmitter/receiver component 104 can be configured to transmit to, and/or receive data from, one or more user equipment devices 120, the one or more other network devices 122, and so on. Through the transmitter/receiver component 104, the network device 102 can concurrently transmit and receive data, can transmit and receive data at different times, or combinations thereof.

The at least one memory 114 can be operatively connected to the at least one processor 116. The at least one memory 114 can store executable instructions that, when executed by the at least one processor 116 can facilitate performance of operations. Further, the at least one processor 116 can be utilized to execute computer executable components stored in the at least one memory 114.

For example, the at least one memory 114 can store protocols associated with facilitating dynamic multiple public land mobile network resource management in advanced networks as discussed herein. Further, the at least one memory 114 can facilitate action to control communication between the network device 102, one or more user equipment devices 120, and/or the one or more other network devices 122 such that the network device 102 can employ stored protocols and/or algorithms to achieve improved communications in a wireless network as described herein.

It should be appreciated that data stores (e.g., the at least one memory 114, the at least one data store 118) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 116 can facilitate respective analysis of information related to facilitating dynamic multiple public land mobile network resource management in advanced networks. The at least one processor 116 can be a processor dedicated to analyzing and/or generating information received, a processor that controls one or more components of the network device 102, and/or a processor that both analyzes and generates information received and controls one or more components of the network device 102.

Further, the term network device (e.g., network node, network node device) is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 102) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 2:
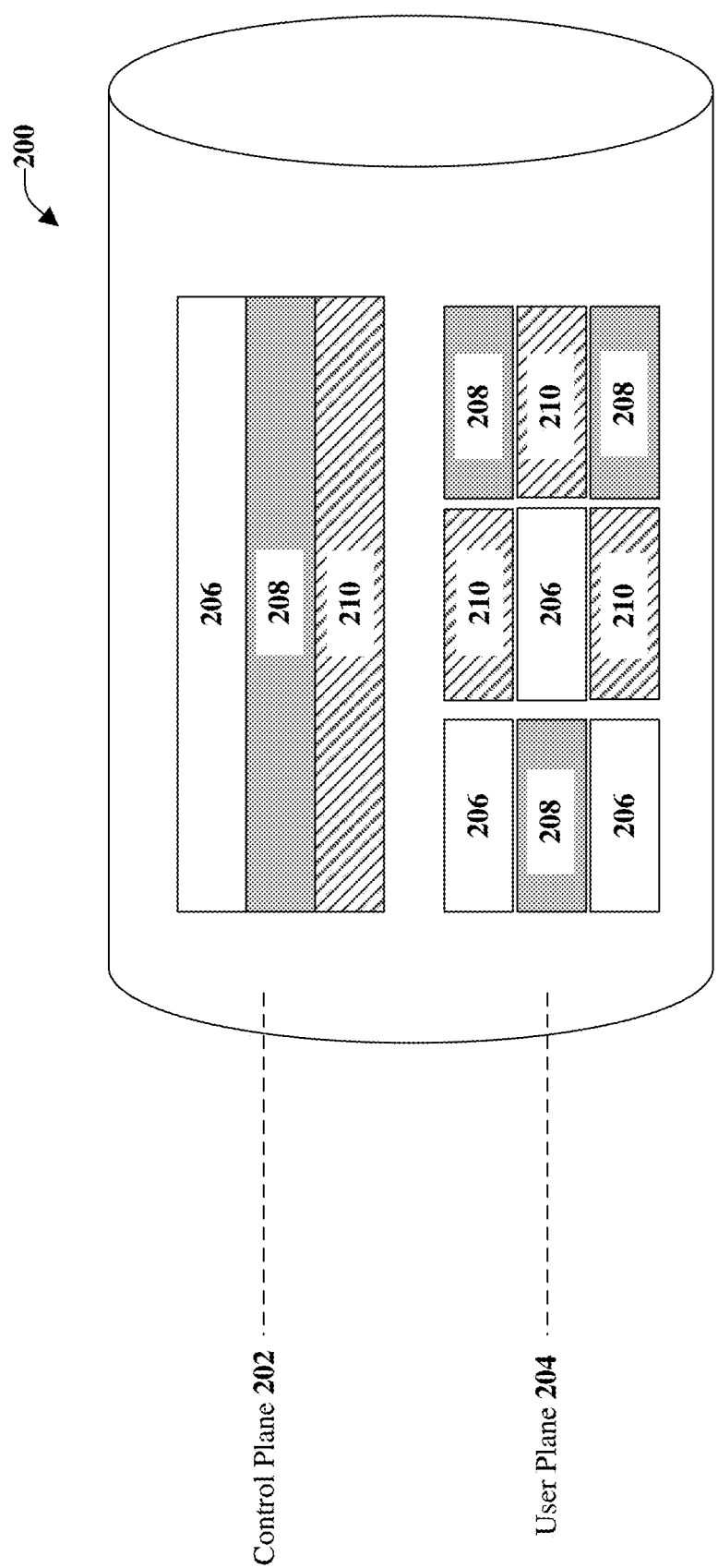
FIG. 2 illustrates an example, non-limiting, schematic representation of an access communication resource in accordance with one or more embodiments described herein.

By way of example and not limitation, FIG. 2 illustrates an example, non-limiting, schematic representation of an access communication resource 200 in accordance with one or more embodiments described herein. Repetitive description of like elements employed in other embodiments described herein is omitted for sake of brevity.

In a 5G network and/or a 6G network, the one or more access communication resources can comprise a control plane 202 and a user plane 204. The control plane 202 is responsible for setting up the communication path, starting a session, paging location updates, setting Quality of Service (QoS), and other functionalities. The user plane 204 is responsible for carrying the user related communication end to end. The user related communication can include, but is not limited to, video data, voice, and streaming videos.

As illustrated the control plane 202 can be divided into slices or carrier networks. In this example, the control plane 202 comprises a first slice 206, a second slice 208, and a third slice 210. However, in accordance with some implementations, the control plane 202 can be divided into fewer or more than three slices.

Also, as illustrated, respective portions of the user plane 204 can be allocated to the one or more slices. For example, a first set of resources can be allocated for the first slice 206, a second set of resources can be allocated for the second slice 208, and a third set of resources can be allocated for the third slice 210. It is noted that although FIG. 2 illustrates equal portions of the user plane 204 allocated to the different slices, the disclosed aspects are not limited to this implementation. For example, in some implementations, an unequal number of resources can be allocated for one or more slices. Further, the allocation of the resources can be dynamically scaled for one or more slices as discussed herein.

Figure 3:
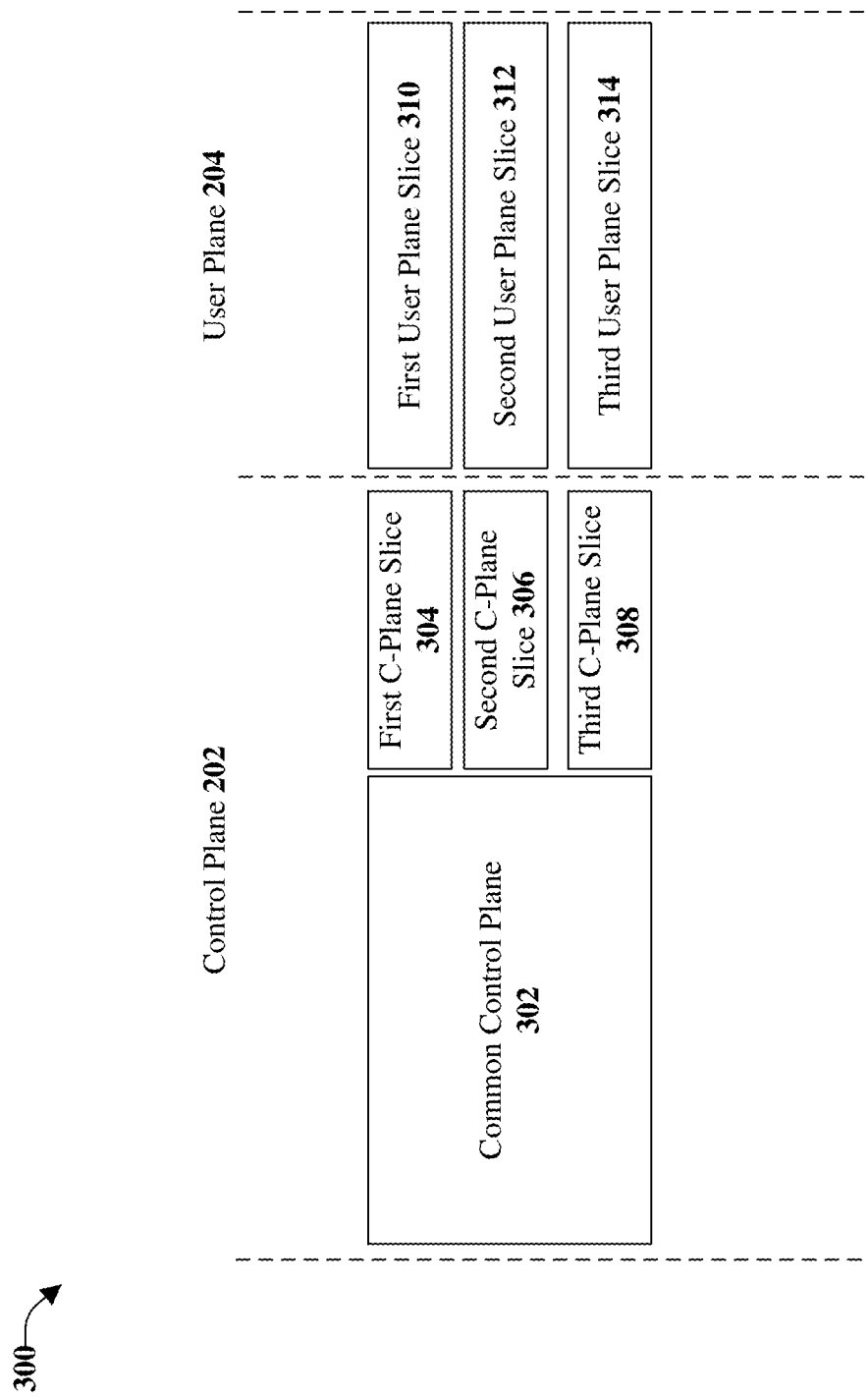
FIG. 3 illustrates an example, non-limiting, schematic representation of allocation of the control plane and the user plane in accordance with one or more embodiments described herein.

FIG. 3 illustrates an example, non-limiting, schematic representation 300 of allocation of the control plane 202 and the user plane 204 in accordance with one or more embodiments described herein. Repetitive description of like elements employed in other embodiments described herein is omitted for sake of brevity.

There are several ways to allocate the control plane 202 and the user plane 204. One option (not shown) is to have a common control plane across all slices and a dedicated user plane for the one or more slices. Another option (not shown) is for the one or more slices to have respective dedicated user planes and dedicated control planes. This option, however, can have a high cost since the control plane is always on (e.g., is always active).

Another option, as illustrated in FIG. 3, is that the one or more slices can have respective combinations of a common control plane and dedicated control planes. Further, the one or more slices can have respective dedicated user planes. This option allows for an always on common control plane and tailored control plane slice-specific control planes.

For example, a common control plane 302 can accommodate a common functionality management such as location update, paging, and other common radio related functionalities. The common control plane 302 can be received by the one or more network devices. The dedicated control planes for the one or more slices (e.g., the first slice 206, the second slice 208, and the third slice 210) are illustrated as a first control plane slice 304, a second control plane slice 306, and a third control plane slice 308. According to some implementations, the first control plane slice 304, the second control plane slice 306, and the third control plane slice 308 can have control over selective handover, setting up the bearer with given QoS and policies for the respective slice (e.g., the first slice 206, the second slice 208, and the third slice 210) and/or other unique slice related functionalities.

Also illustrated are the dedicated user planes for the user plane 204 (e.g., the first slice 206, the second slice 208, and the third slice 210). Specifically, illustrated are a first user plane slice 310, a second user plane slice 312, and a third user plane slice 314. Thus, by way of example and not limitation, a first network device can receive data over the common control plane 302, the first control plane slice 304, and the first user plane slice 310. A second network device can receive data over the common control plane 302, the second control plane slice 306, and the second user plane slice 312. Further, a third network device can receive data over the common control plane 302, the third control plane slice 308, and the third user plane slice 314.

Thus, each slice can have a combination of the common control plane 302 and the respective dedicated control plane. Further, each slice can have a dedicated user plane. The common control plane can accommodate a common functionality management, such as location update, paging, location of an agent, and/or other common radio related functionalities. Further, the dedicated control plane for each slice can have control over selective handover, setting up the bearer with given QoS and policies for that specific slice and other unique slice related functionalities. Each carrier or tenant can have its own policies and/or other unique functionalities.

In an example, there can be a hierarchy wherein a first layer (e.g., a top layer) comprises different operators (e.g., PLMN) and a second layer (e.g., a bottom layer) that can be utilized for enterprise purposes. By having a two-layer hierarchy, flexibility of routing the traffic can be enabled. For example, the network traffic can go through the core of the host carrier platform and then to the intended destination (e.g., the tenant). In another example, the network traffic can bypass the core of the host carrier platform and go directly to the core of the tenant.

Figure 4:
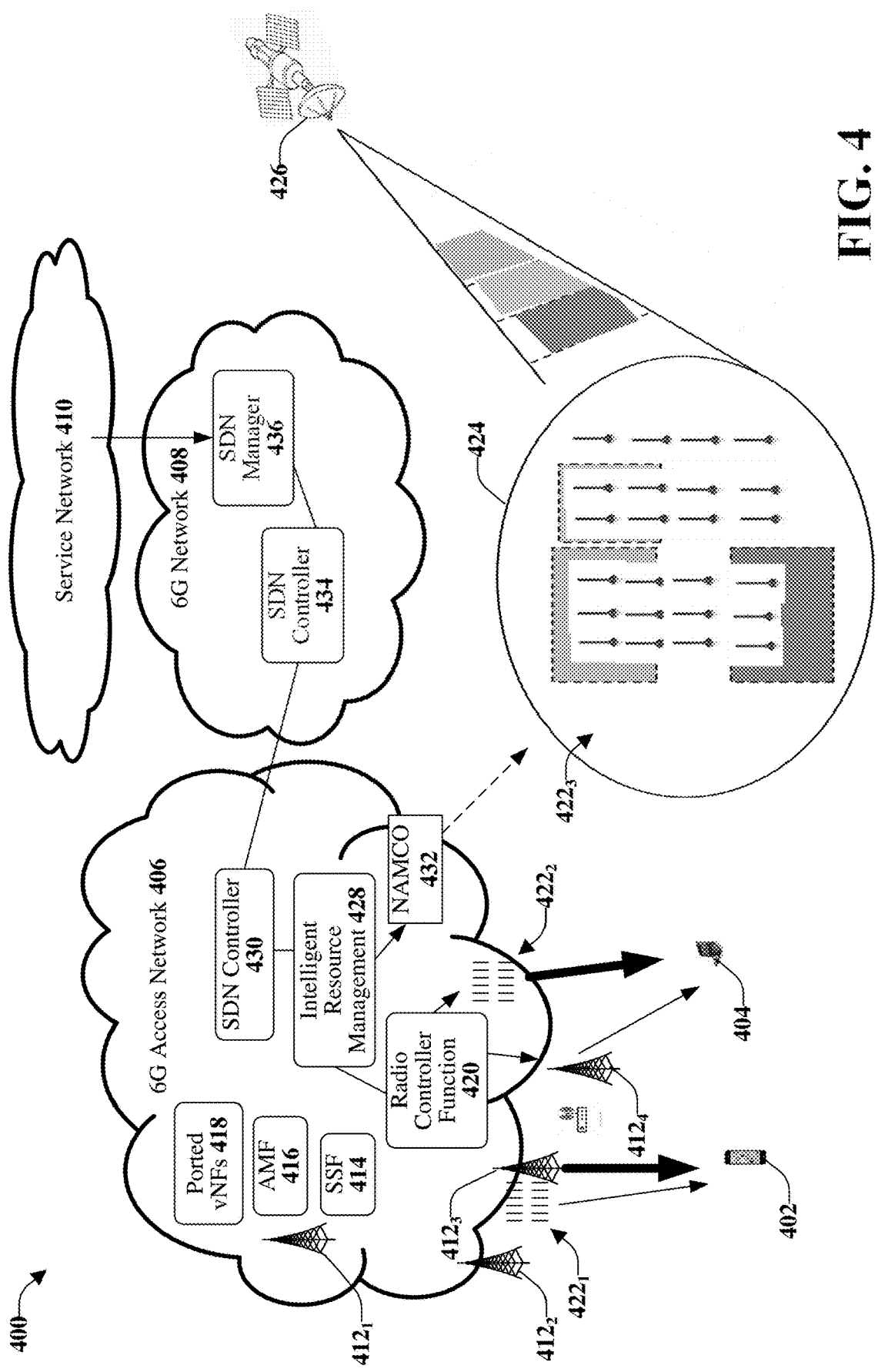
FIG. 4 illustrates an example, non-limiting, system for antenna farm intelligent software defined network enabled dynamic resource controller in advanced networks in accordance with one or more embodiments described herein.

FIG. 4 illustrates an example, non-limiting, system 400 for antenna farm intelligent software defined network enabled dynamic resource controller in advanced networks in accordance with one or more embodiments described herein.

As illustrated one or more User Equipment devices (UEs), illustrated as a first UE 402 and a second UE 404, can be communicatively coupled to an access network (e.g., a 6G access network 406). The 6G access network 406 can be communicatively coupled to a 6G network 408 and associated service network 410. The one or more UEs (e.g., the first UE 402 and the second UE 404) can interface with the 6G access network 406 through respective base stations, a few of which are illustrated at base stations $412_1$, $412_2$, $412_3$, and $412_4$.

Included in the 6G access network 406 can be a Services Switching Function (SSF) device 414, an Access Management Function (AMF) device 416, one or more ported network functions virtualization (vNF) devices 418. Also included can be a radio controller function device 420 that can communicate with one or more the base stations and/or one or more antenna farms, illustrated as a first antenna farm $422_1$ and a second antenna farm $422_2$. An exploded view of an antenna farm 424 is illustrated. The antenna farm 424 can communicate with one or more satellites 426 of a satellite network.

The radio controller function device 420 can also be communicatively coupled to an Intelligent Resource Management Function Device (IRMF device 428), a Software Defined Networking (SDN controller device 430), and a None Terrestrial Access Management Controller (NAMCO) device (e.g., a NAMCO device 432). Further, the 6G network 408 can comprise an SDN controller device 434 and an SDN manager device 436.

While satellite communication can accrue through a stream of signal from satellite to ground antenna, there can be challenges with signal quality, reception of different bandwidths depending of the amount of data and dynamic of the downstream data as the services demand can change constantly. The various aspects can resolve this challenge, as well as other challenges, with a number of Nano antennas that can be pooled in the access network 406. This can be further communicated to the subscriber (e.g., the first UE 402 and the second UE 404) through the most available access capabilities such as Wi-Fi, 5G NR, and so on. While communication accrues between satellite and other parts of the network, the NAMCO device 432 can communicate with the access management controller function in access slice and coordinate/manage the amount of data streaming through part of Nano antennas for a specific service as illustrated in FIG. 4. The number of Nano antennas chosen for a specific service can change dynamically through the NAMCO device 432, depending on the amount of data as well as signal quality coming from the satellite. Since, the signal quality of satellite can vary depending on weather conditions, the Nano antenna can receive the signal and through compare and contrast can reproduce a clear and suable data stream. The quality of the data stream can vary with number of Nano antennas receiving the signals, QoS can be applied to this equation depending of type of service and service level agreement (SLA) with a subscriber.

While the NAMCO device 432 can communicate with the intelligent resource manager in the 6G access slice, it will not be able to control the number of nano antennas assigned for each stream, or each session. It is the N controller in the network that works with STN manager. The STN manager talks to the service network, so it knows what kind of traffic, the quality of experience, the quality of services earmarked for each stream. It knows the importance and the priorities, is it a premium stream, or it just a streaming video, and so on.

Upon or after that is established, it will talk to the NAMCO and a network can be determined and the number of antennas can be changed. For example, when there is a full NANO antenna sending the same packages and it is determined that the packages are not arriving in the correct order or the right quality, the antennas can be changed from four antennas to six antennas (or a different number of antennas). In another example, if there are a large number of antennas and there is another service being used with these antennas and that is taking priority, the number of antennas can be reduced, and their respective manner of processing can be changed. For example, the reduced number of antennas can be compensated for based on a better use of resources.

Therefore, according to various implementations, the quantity of antennas being used for each service and session can be changed dynamically. Further, how this information is being used or processed can be changed through different codec or different algorithms and, if needed, feedback can be provided. In some implementations, the satellite communication can be used as predominantly a secondary means of communication because of the nature of the resource, so in the resource management section, changes can be made related to what other resources need to be engaged for that specific session.

The radio controller function can control and/or enable all access radios such as 4G, 6G, Wi-Fi, 6 LoWPAN (IPv6 over Low-Power Wireless Personal Area Networks), and so on. The access management function can decide what technologies are prioritized for the specific service. P_vNF are ported functionalities that can comprise any core functionality that seem to amplify the performance of the access slice such as MME in 4G technology or edge computing function where traffic is kept close to the source and the result can be transmitted back to the client for a high-performance service such as video analysis of on incident at premises. An SDN Controller is a software defined network and its agent communicating the intelligent decisions cross service, core, backhaul and access network.

Further, an RMLog: (Resource Management Log) can include baseband, digital signal processing, medium access control, networking, and management information. This information can be used in similar circumstances that occur for a streamlined, efficient and intelligent management of the resources. As this log keeps growing it can make the decision-making process much more efficient by referring back to similar circumstances and comparing the result and fine tuning the decision for an optimal result. Further, the IRMF (Intelligent Resource Management Function) can consider traffic load, access types (6G, 4G, 3G, Wi-Fi, and so on) and their signal strength which inline will decide traffic distribution cross available access types and slices already instantiated or available in E-comp to be instantiated. IMF can also decide the optimal physical (connection with transceivers) and functional (vNFs in slices) elements. IRM can also facilitate a deciding role on which transceivers will be used on what spectrum and how much power.

Figure 5:
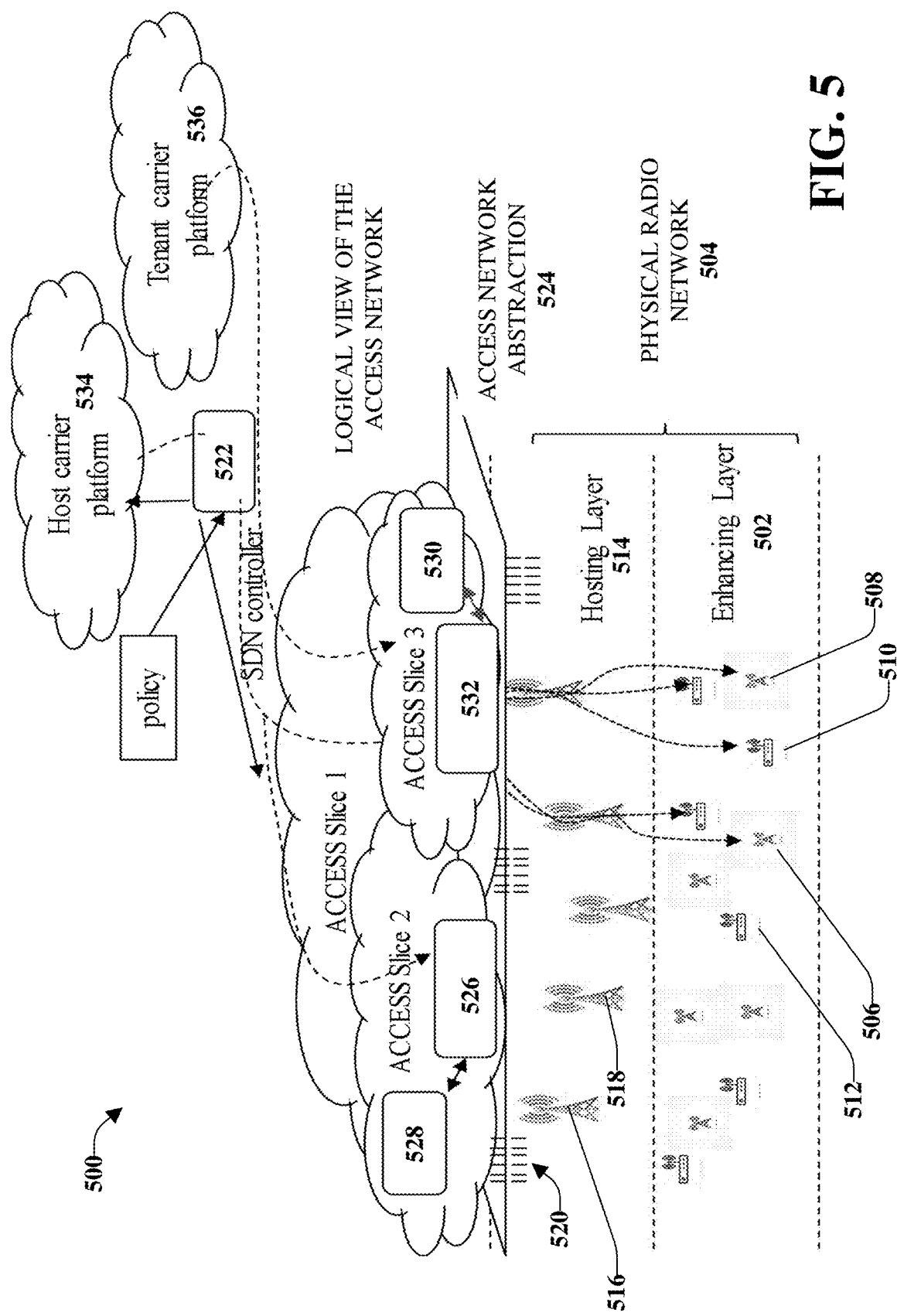
FIG. 5 illustrates an example, non-limiting, system for facilitating dynamic multiple public land mobile network resource management in advanced networks in accordance with one or more embodiments described herein.

FIG. 5 illustrates an example, non-limiting, system 500 for facilitating dynamic multiple public land mobile network resource management in advanced networks in accordance with one or more embodiments described herein. Repetitive description of like elements employed in other embodiments described herein is omitted for sake of brevity.

The system 500 can facilitate a 6G ubiquitous wireless communications network in accordance with one or more embodiments described herein. 6G networks aim to provide enhanced speed, coverage, and bandwidth as well as ubiquitous connectivity. Further, there is more potential for different applications and services, such as connected infrastructure, wearable computers, autonomous driving, Internet of Everything (IoE), seamless virtual reality, augmented reality and ultra-high-fidelity virtual reality (which consumes about fifty times the bandwidth of a high-definition video stream), and so on. As used herein, the term "ubiquitous" as it relates to a 6G network in the embodiments presented herein can mean a large or endless number of access technologies working together to create universal coverage and always-on broadband global network. For example, more integrated terrestrial wireless with satellite systems (with using specially designed nanoantennas) in the access network can be provided.

Illustrated in FIG. 5 is an integrated network comprising access devices facilitating access to one or more different networks (e.g., terrestrial networks and satellite networks). For example, the access device can comprise terrestrial controllers (e.g., macro cell base station devices, millimeter wave base station devices, femto cell access devices, Wi-Fi access point devices, and the like) that provide access to a terrestrial network (e.g., macro cell, micro cell, femto cell, etc.). Further, the terms "femto" and "femto cell" are used interchangeably, the terms "macro" and "macro cell" are used interchangeably and the terms "micro" and "micro cell "are used interchangeably. The satellite controller can be or can include a satellite communication system in some embodiments.

As used herein, the term "terrestrial" means Earth-based. Thus, a terrestrial network can be any network that transmits and/or receives signals from Earth. By contrast, a satellite network can be a network that transmits and/or receives signals via satellite communication. Similarly, a terrestrial controller is a device that controls one or more aspects of communication, resource allocation, or the like for a terrestrial network while a satellite controller is a device that controls one or more aspects of communication, resource allocation, or the like for satellite communication.

As depicted in FIG. 5, enhancing layers (e.g., an enhancing layer 502) are those layers of a physical radio network 504 of an integrated network that can include one or more access devices/small networks (including, but not limited to, femto cells/femto cell access point devices such as femto cell access point devices 506, 508 and Wi-Fi/Wi-Fi access point devices 510, 512) that facilitate provisioning of more bandwidth locally within close proximity to the mobile device (e.g., a user equipment device).

Hosting layers (e.g., a hosting layer 514) can include one or more access or base station devices (e.g., base station devices 516, 518, satellite devices such as satellite farm 520)/networks that are more substantial in coverage area (including, but not limited to, cellular communication via cells such as macro cells and satellite communication via satellite communication networks). The enhancing layer 502 and the hosting layer 514 can comprise the physical radio network 504.

The physical radio network 504 can comprise an integrated network. In one or more embodiments described herein, the integrated network can comprise a terrestrial network (not shown) and a satellite network (not shown) integrated with one or another via a controller (e.g., software-defined networking (SDN) controller 522) that communicates with both networks and provides intelligent access network selection. One or more terrestrial networks can exist for different types of networks, each terrestrial network controlled by a terrestrial controller.

Terrestrial controllers, for example, can be or can control an access point device for a femto cell (e.g., access point device 512) or for Wi-Fi (e.g., access point device 506), for example, while another terrestrial controller (not shown) can be or can control a base station device (e.g., base station device 518) for a macro cell or millimeter wave network, for example. A satellite controller can control one or more satellite networks in various embodiments. The terrestrial controllers (and/or, in some embodiments, the mobile devices to which they are communicatively coupled) can communicate directly with the SDN controller 522. The satellite controller can communicate directly with the SDN controller 522.

An access network abstraction 524 is a logical layer above the physical radio network and is the location of the integrated system of the embodiments described herein wherein the intelligent access network selection can be provided (e.g., via the SDN controller 522). The SDN controller 522 can select the best access technology/network for a particular mobile device and a given application or service in one or more embodiments. The SDN controller 522 can receive and evaluate information indicative of one or more aspects of the integrated network.

The access network abstraction 524 can be a logical view of one or more components or functionality that can determine the resources available (e.g., knowledge or information regarding where the resources are available, how much of the resource is available, the coverage of the resource, the condition of the resource, the connectivity between the access points) and/or assign terrestrial and/or satellite resources for provisioning one or more applications or services. Thus, the access network abstraction 524 can provide a logical view of the entire network, including both the terrestrial and the satellite networks. The knowledge is presented to the SDN controller 522 (which has the big picture of the ubiquitous access network) and can determine what resources to allocate to what devices and applications when it is needed. The SDN can control a system that integrates terrestrial and satellite networks to provide applications and/or services that meet various specifications and/or service levels in spite of ever-changing resources in the terrestrial and satellite networks. The system of FIG. 5 can integrate different types of devices and networks to provide access to different applications and services for users.

The SDN controller 522, a terrestrial controller, and a satellite controller will now be described. In some embodiments, one or more components of the SDN controller 522 can be software, hardware or a combination of software and hardware.

Access slice 2 can comprise a radio control function 526 and an intelligent resource management component 528 that can determine and/or receive information or resources needed, requested or suitable for one or more resources for an application and/or service for a mobile device. The intelligent resource management component 528 can communicate directly with the SDN controller 522 and service layer and can determine the resources needed both on the access and backhaul networks. The intelligent resource management component 528 can determine and/or receive information or resources needed, requested or suitable for one or more resources for an application and/or service for a mobile device.

Access slice 3 can comprise an intelligent resource management component 530 and a satellite radio controller function 532. In some embodiments, one or more components of the satellite controller 532 can be software, hardware or a combination of software and hardware. The intelligent resource management component 530 and/or satellite radio controller function 532 can control the resources both in the access and backhaul networks and provide a feedback to the system as a form of artificial intelligence (AI) to further improve a prediction of resources needed for different services in the network.

Access network or its core network can be implemented in such a manner that the entire traffic from the access network goes into the dedicated core (e.g., host carrier platform 534) and from there the traffic is relabeled and sent to certain functions within that core. This can be referred to as sub-labeling the network traffic. However, this is not the most desired or efficient way of routing network traffic. This is especially true when a host carrier platform is hosting access to companies that do not want their data going into any core due to privacy issues. Therefore, as discussed herein, the data packet leaving the user equipment device in the access and core is going to a dedicated core for that specific carrier (e.g., the tenant carrier platform 536). Once information leaves the user equipment device, the network service provider can know that the host carrier platform does not touch anything except the access and the data packet goes directly to the network service provider.

Further, as discussed herein, the dynamic sharing of network resources in not static. For example, there is one gigabyte coming from the eNodeB and going to the multiple cores. How much data goes through which carrier and/or which core can be dynamic and can depend on a service level agreement and/or other criteria.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
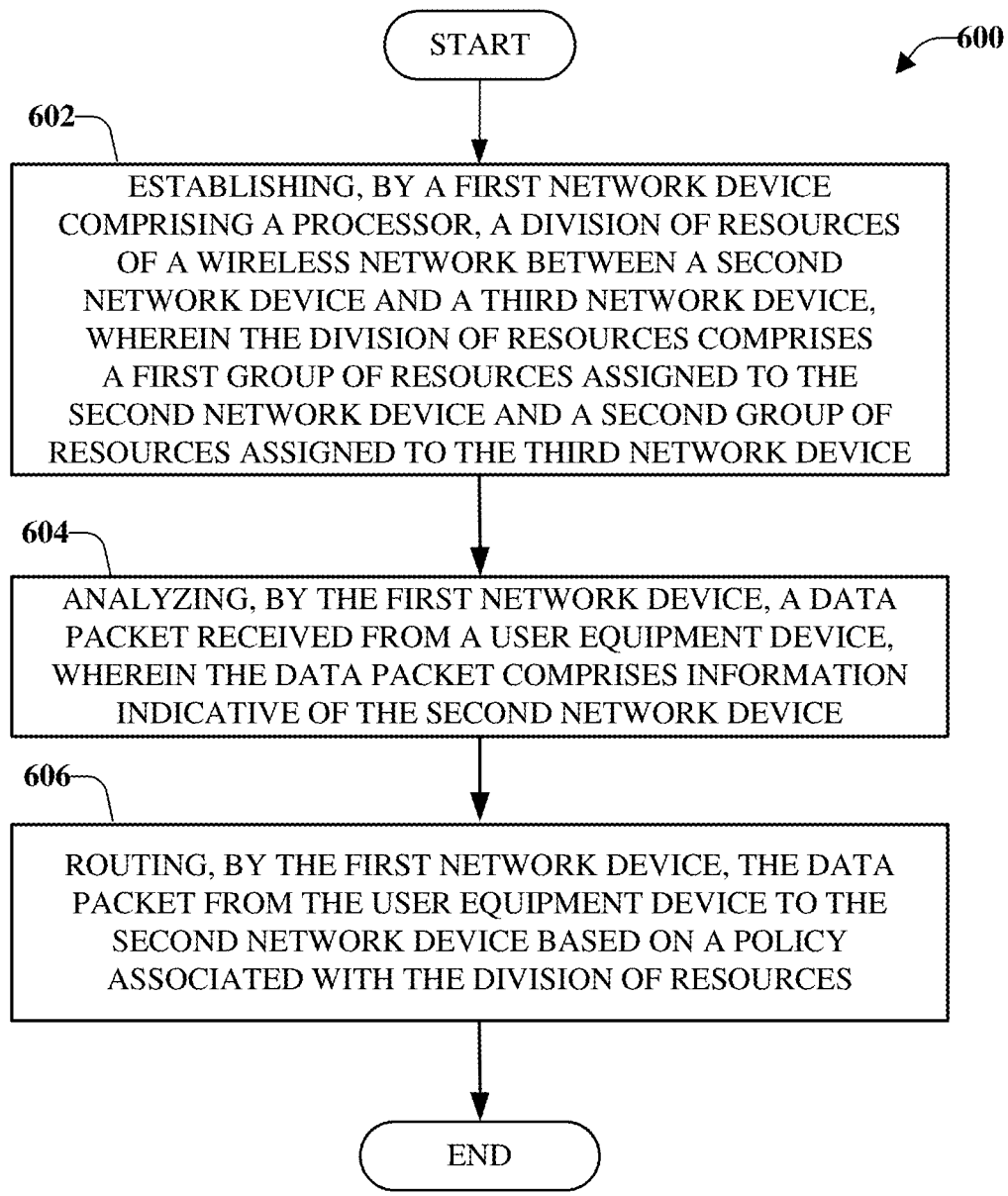
FIG. 6 illustrates a flow diagram of an example, non-limiting, computer-implemented method for facilitating dynamic multiple public land mobile network resource management in advanced networks in accordance with one or more embodiments described herein.

FIG. 6 illustrates a flow diagram of an example, non-limiting, computer-implemented method 600 for facilitating dynamic multiple public land mobile network resource management in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a first network device comprising a processor can establish a division of resources of a wireless network between network devices (e.g., via the allocation component 110). The division of resources can comprise a first group of resources assigned to a second network device and a second group of resources assigned to a third network device. Further, other groups of resources can be assigned to other network devices. The resources can comprise pooled radio access network resources. Further, the wireless network can be adapted to operate according to a sixth generation wireless telecommunication protocol.

According to some implementations, the first network device can be associated with a wireless network platform that hosts communications within the wireless network. The second network device can be associated with a first service provider core network. In addition, the third network device can be associated with a second service provider core network. Subsequent network devices can be associated with subsequent service provider core networks.

The first network device can, at 604 of the computer-implemented method 600, analyze a data packet received from a user equipment device (e.g., via the assessment component 106). For example, the data packet can comprise information indicative of the second network device.

Further, the data packet can be routed from the user equipment device to the second network device based on a policy associated with the division of resources, by the first network device at 606 of the computer-implemented method 600 (e.g., via the transmitter/receiver component 104). According to some implementations, to route the data packet, the computer-implemented method 600 can comprise bypassing an access core of the first network device during the routing the data packet. Bypassing the access core of the first network device can be based on routing the data packet to avoid being routed through the access core of the first network device. In an example, routing the data packet can comprise forwarding the data packet to an access core and a service delivery platform of the second network device.

In accordance with some implementations, establishing the division of resources, at 602, can comprise assigning a first access slice to the second network device and assigning a second access slice to the third network device. A first capacity can be associated with the first access slice and a second capacity can be associated with the second access slice. The first capacity and the second capacity can be different levels of capacities determined based on a network sharing policy.

According to some implementations, the first capacity and the second capacity are scalable capacities. Further to these implementations, the computer-implemented method can comprise fluctuating, by the first network device, a first level of the first capacity and a second level of the second capacity based on a defined parameter.

In some implementations, the computer-implemented method can comprise detecting, by the first network device, a trigger event associated with the user equipment device. Further to these implementations, the computer-implemented method can comprise increasing, by the first network device, the first capacity based on detecting the trigger event and a defined policy associated with the trigger event.

In accordance with some implementations, establishing the division of resources can comprise comparing a first service level agreement for the second network device with a second service level agreement for the third network device. Further to these implementations, the computer-implemented method can comprise distributing the resources between the second network device and the third network device based on the comparison.

Figure 7:
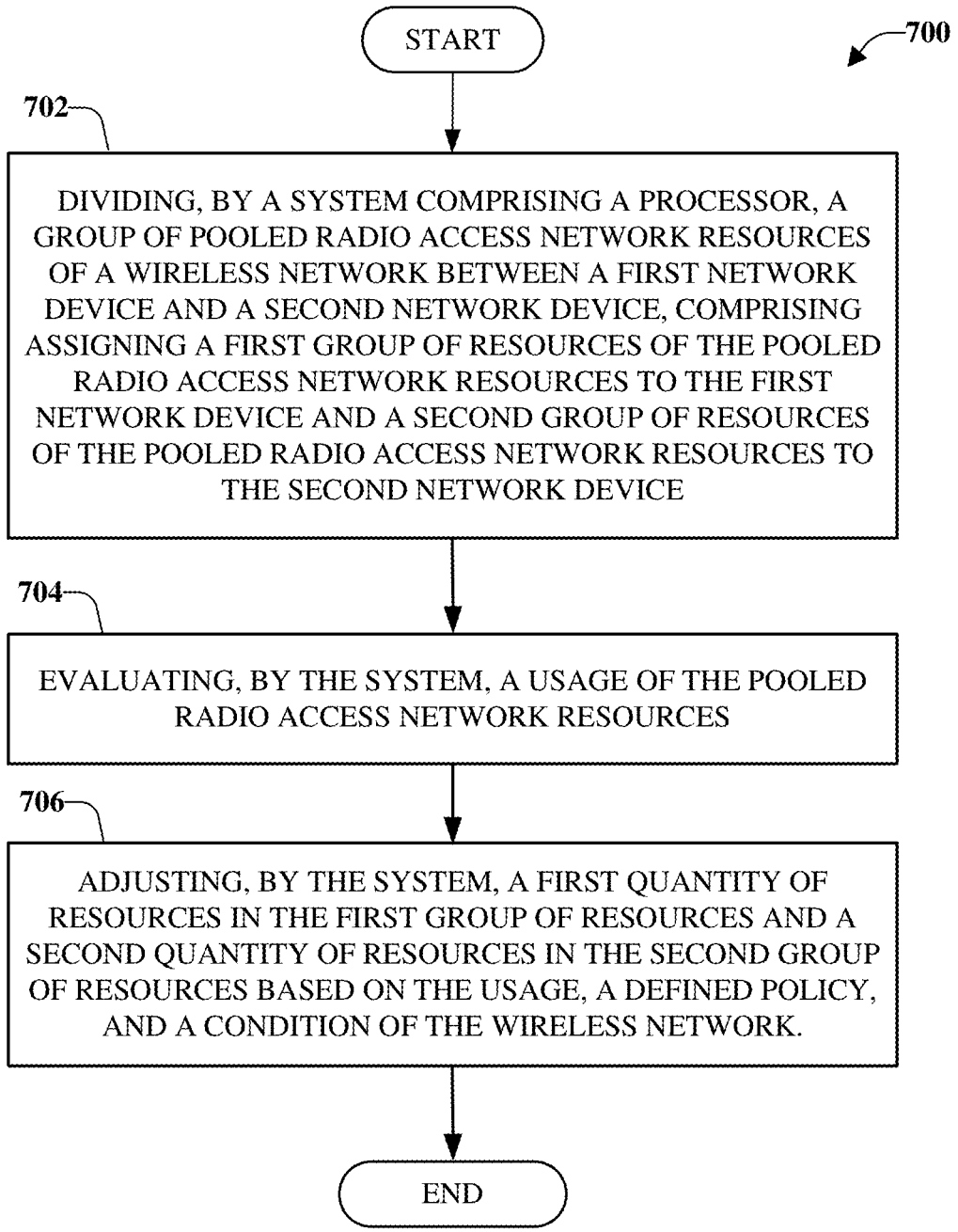
FIG. 7 illustrates a flow diagram of an example, non-limiting, computer-implemented method for allocating radio access network resources in advanced networks in accordance with one or more embodiments described herein.

FIG. 7 illustrates a flow diagram of an example, non-limiting, computer-implemented method 700 for allocating radio access network resources in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a system comprising a processor can divide a group of pooled radio access network resources of a wireless network between a first network device and a second network device. For example, dividing the group of pooled radio access network resources can comprise assigning a first group of resources of the pooled radio access network resources to the first network device and a second group of resources of the pooled radio access network resources to the second network device.

According to some implementations, assigning the first group of resources can comprise a first amount of resources and the second group of resources can comprise a second amount of resources. The first amount of resources and the second amount of resources can be configurable amounts that can fluctuate based on the defined policy and/or other parameters (e.g., premium service, policies) and/or a trigger event (e.g., an emergency situation, national security situation, a large gathering of user equipment devices and associated users (e.g., a rock concert, a sporting event), which can be planned gatherings and/or unplanned gatherings)), and so on.

A usage of the pooled radio access network resources can be evaluated by the system, at 704 of the computer-implemented method 700. The system can adjust a first quantity of resources in the first group of resources and a second quantity of resources in the second group of resources based on the usage, a defined policy, and a condition of the wireless network, at 706 of the computer-implemented method 700. The condition can be, for example, an amount of network congestion, a trigger event, and so on.

For example, adjusting the first quantity of resources can comprise increasing the first quantity of resources based on a determination that the condition is an emergency situation and that the first network device is associated with user equipment devices of responders to the emergency situation. Further to this example, the second quantity of resources can be decreased and these resources can be used to increase the first quantity of resources.

The various aspects provided herein can facilitate dynamic sharing of pooled RAN resources and division of the resources among different tenants according to service level agreement and host carrier policy. For example, a tenant provider could be limited to only share the RAN with the host carrier and user their own core and service delivery platform. Further, the disclosed aspects can allow a hosting carrier to use a policy to provide guidelines on how to dynamically share among the tenant carriers. The policy can include, but is not limited to, radio resource layer, meet service level agreement and management requirements (e.g. monitoring, and so on) if needed. Accordingly, the disclosed aspects can reduce capital expenditures and/or operating expenditure while improving the radio network usage efficiency. Further, the disclosed aspects can enable more openness and sharing of the common infrastructure required by 6G.

Described herein are systems, methods, articles of manufacture, and other embodiments or implementations that can facilitate dynamic multiple public land mobile network resource management in advanced networks with multiple transmission points. Facilitating dynamic multiple public land mobile network resource management in advanced networks with multiple transmission points can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (cRAN) can enable the implementation of concepts such as SDN and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 8:
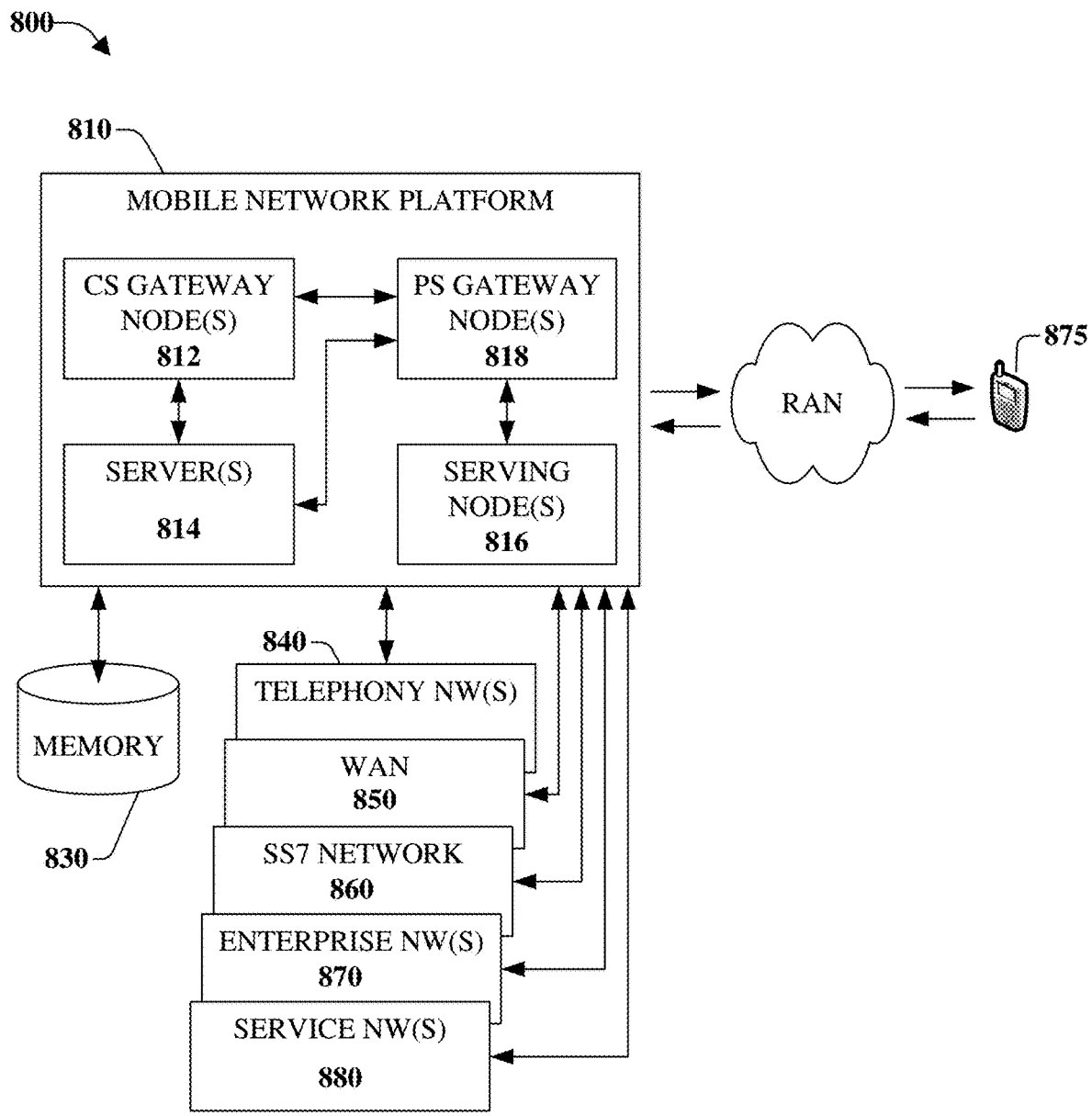
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or Public Land Mobile Network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless network platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
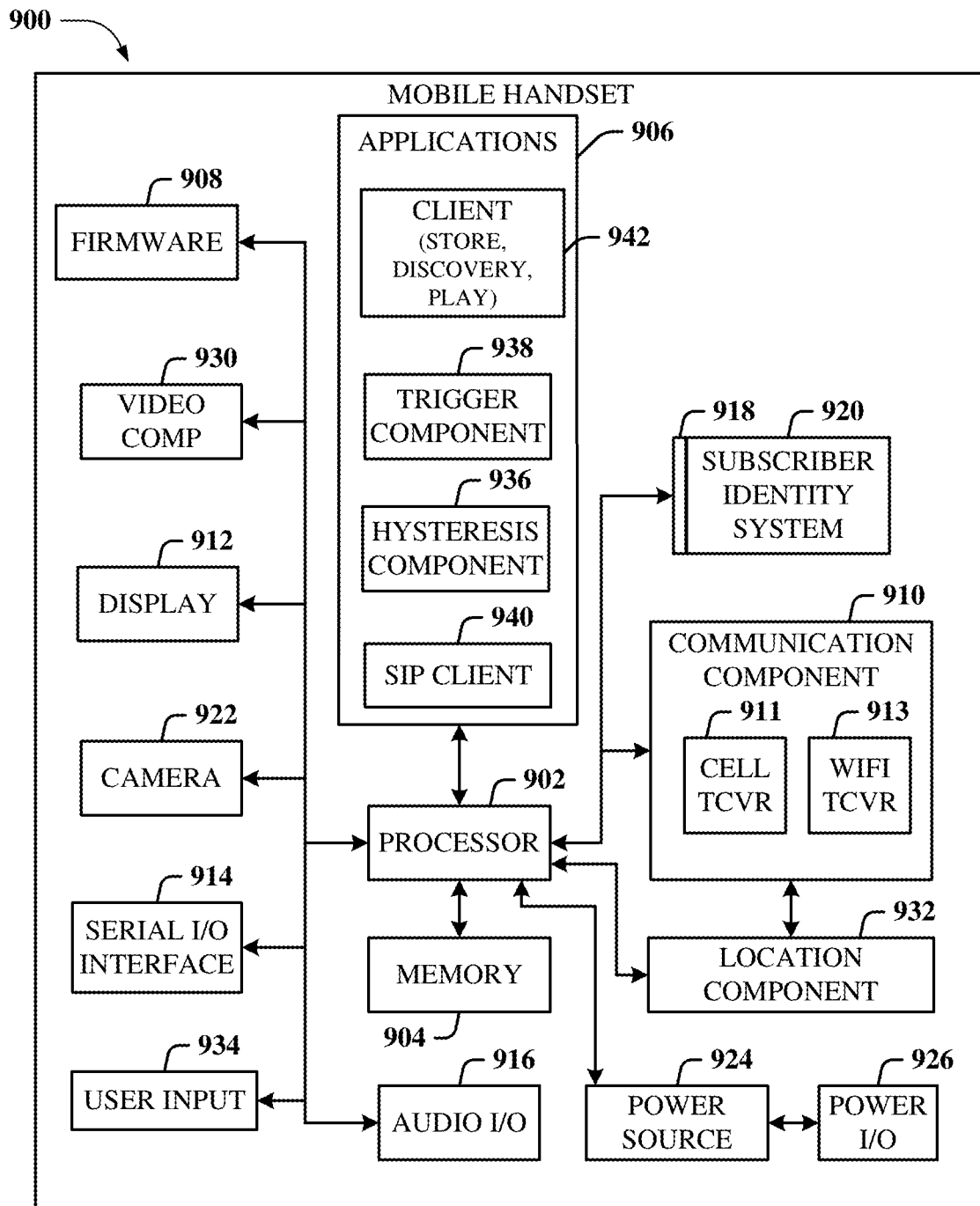
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
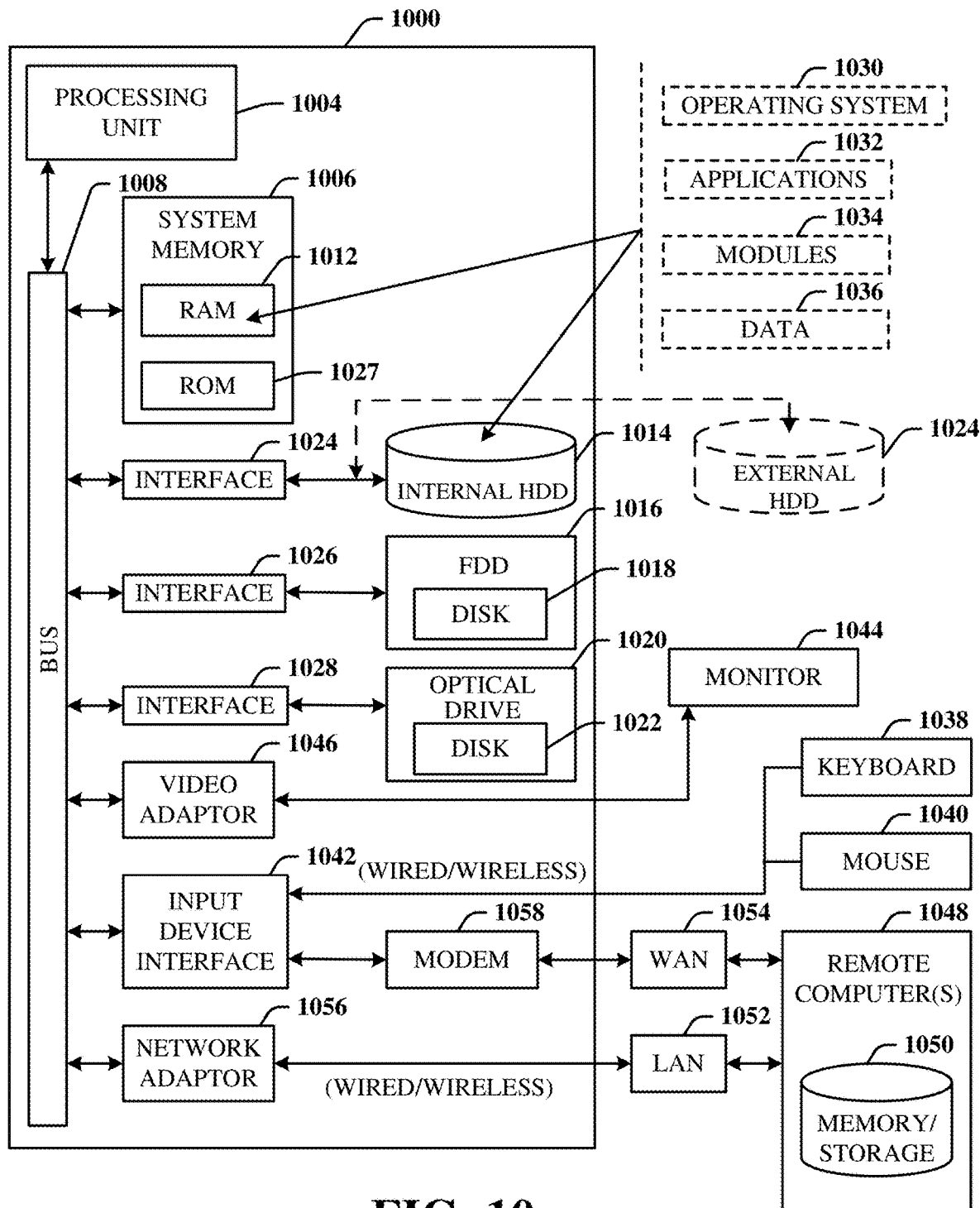
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random-access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 6G, Universal Mobile Telecommunications System (UMTS), and/or Long Term Evolution (LTE), or other next generation networks, the disclosed aspects are not limited to 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 6G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    establishing, by first network equipment comprising a processor, a division of network resources between second network equipment and third network equipment, wherein the division of network resources comprises a first group of resources assigned to the second network equipment and a second group of resources assigned to the third network equipment, and wherein the division of network resources is changeable as a function of respective amounts of data consumed at the second network equipment and the third network equipment, and based on respective trigger events and respective policies associated with first subscriber identities of first subscribers of the second network equipment and second subscriber identities of second subscribers of the third network equipment;

analyzing, by the first network equipment, a data packet received from a user equipment, wherein the data packet comprises information indicative of the second network equipment; and routing, by the first network equipment, the data packet from the user equipment to the second network equipment based on a policy associated with the division of network resources, wherein the first network equipment is a host carrier and the second network equipment and the third network equipment are tenant carriers of the host carrier, and wherein the routing is based on a host carrier policy that comprises processes for sharing the network resources between the second network equipment and the third network equipment.

2. The method of claim 1, further comprising:

bypassing, by the first network equipment, an access core of the first network equipment during the routing the data packet, wherein bypassing the access core of the first network equipment is based on routing the data packet to avoid being routed through the access core of the first network equipment.

3. The method of claim 2, wherein the first network equipment is associated with a wireless network platform that hosts communications within a communications network comprising the network resources, wherein the second network equipment is associated with a first service provider core network, and wherein the third network equipment is associated with a second service provider core network.

4. The method of claim 1, wherein the routing comprises forwarding the data packet to an access core and a service delivery platform of the second network equipment.

5. The method of claim 1, wherein the establishing comprises:

assigning a first access slice to the second network equipment; and assigning a second access slice to the third network equipment wherein a first capacity is associated with the first access slice and a second capacity is associated with the second access slice.

6. The method of claim 5, wherein the first capacity and the second capacity are different levels of capacities determined based on a network sharing policy.

7. The method of claim 5, wherein the first capacity and the second capacity are scalable capacities, and wherein the method further comprises:

fluctuating, by the first network equipment, a first level of the first capacity and a second level of the second capacity based on a defined parameter.

8. The method of claim 5, further comprising:

detecting, by the first network equipment, a trigger event associated with the user equipment; and increasing, by the first network equipment, the capacity based on the detecting the trigger event and a defined policy associated with the trigger event.

9. The method of claim 1, wherein establishing the division of network resources comprises:

comparing a first service level agreement for the second network equipment with a second service level agreement for the third network equipment; and distributing the network resources between the second network equipment and the third network equipment based on the comparing.

10. The method of claim 1, wherein the network resources comprise pooled radio access network resources.

11. The method of claim 1, wherein network resources are enabled via a communications network that is adapted to operate according to a sixth generation wireless telecommunication protocol.

12. A system, comprising:

a processor; and a memory that stores executable instructions that, when executed by the processor, facilitate performance of operations, comprising:

dividing pooled radio access network resources enabled via a communications network between first network equipment and second network equipment, comprising assigning a first group of resources of the pooled radio access network resources to the first network equipment and a second group of resources of the pooled radio access network resources to the second network equipment, wherein a division of the pooled radio access network resources is configurable based on usage of the pooled radio access network resources, a defined policy applicable to the pooled radio access network resources, and an event determined to be associated with the communications network, and wherein the first network equipment and the second network equipment are tenant carriers of a host carrier of the pooled radio access network resources enabled via the communications network;

evaluating the usage of the pooled radio access network resources; and adjusting a first quantity of resources in the first group of resources and a second quantity of resources in the second group of resources based on the usage, the defined policy, and the event, wherein the defined policy is a host carrier policy that comprises guidelines for sharing of the pooled radio access network resources between the first network equipment and the second network equipment.

13. The system of claim 12, wherein the adjusting comprises increasing the first quantity of resources based on a determination that the event is an emergency situation and that the first network equipment is associated with respective user equipment of responders to the emergency situation.

14. The system of claim 12, wherein assigning the first group of resources comprises a first amount of resources and the second group of resources comprises a second amount of resources, and wherein the first amount of resources and the second amount of resources are configurable amounts that fluctuate based on the defined policy.

15. The system of claim 12, wherein the operations further comprise:

receiving a data packet from a user equipment, wherein the data packet comprises an indicator;

determining that the data packet is to be scheduled for the first network equipment based on the indicator; and routing the data packet to the first network equipment, wherein the data packet bypasses an access core of the communications network.

16. The system of claim 15, wherein routing the data packet comprises bypassing the access core of the communications network based on routing the data packet to avoid being routed through the access core of the communications network.

17. The system of claim 15, wherein routing the data packet comprises forwarding the data packet to the access core and a service delivery platform of the first network equipment.

18. A non-transitory machine-readable medium, comprising executable instructions that, when executed by a processor, facilitate performance of operations, comprising:

dividing communications network resources between a first network device and a second network device based on defined service level agreements, wherein the first network device and the second network device are tenant carriers associated with respective service providers that utilize the communications network resources, and wherein the dividing is based on a host carrier policy that comprises guidelines for the dividing, and wherein the dividing is configurable based on a first amount of data consumed at the first network device, first priorities assigned to the first amount of data, a second amount of data consumed at the second network device, second priorities assigned to the second amount of data, and a defined trigger event;

receiving a data packet from a mobile device, wherein the data packet comprises an indication that the first network device provides services for the mobile device; and transferring the data packet to the first network device based on the communications network resources assigned to the first network device and based on the data packet bypassing access core network equipment.

19. The non-transitory machine-readable medium of claim 18, wherein the dividing comprises:

assigning a first access slice to the first network device; and assigning a second access slice to the second network device wherein a first capacity is associated with the first access slice and a second capacity is associated with the second access slice.

20. The non-transitory machine-readable medium of claim 19, wherein the operations further comprise:

evaluating a condition of at least a portion of a communications network, which enables the communications network resources, for the defined trigger event;

increasing a first level of the first capacity based on a detection of the defined trigger event; and decreasing a second level of the second capacity based on the detection of the defined trigger event.

\* \* \* \* \*